United States Patent

[11] 3,595,599

| [72] | Inventor | Michael Gale Black<br>8401 Wheatland, Sun Valley, Calif. 91352 |
|---|---|---|
| [21] | Appl. No. | 812,090 |
| [22] | Filed | Apr. 1, 1969 |
| [45] | Patented | July 27, 1971 |

[54] BICYCLE TO ACCOMODATE DIFFERENT SIZE RIDERS
4 Claims, 4 Drawing Figs.

| [52] | U.S. Cl. | 280/282 |
|---|---|---|
| [51] | Int. Cl. | B62k 3/02 |
| [50] | Field of Search | 280/282;<br>Des. 90/8, 16 |

[56] References Cited
UNITED STATES PATENTS

| D. 200,040 | 1/1965 | Brown | D.90/8 |
|---|---|---|---|
| D. 216,856 | 3/1970 | Black | D.90/8 |
| 3,096,100 | 7/1963 | Clarke et al. | 280/282 X |
| 3,116,073 | 12/1963 | Ott et al. | 280/282 X |
| 3,352,570 | 11/1967 | Cordrey | 280/282 |

FOREIGN PATENTS

| 141,949 | 11/1948 | Australia | D.90/16 |
|---|---|---|---|

OTHER REFERENCES

Cycle World, September 1966, page 100, " TRAIL Scooter"

*Primary Examiner*—Leo Friaglia
*Attorney*—Julius L. Rubinstein

ABSTRACT: The bicycle is characterized by an inclined front wheel fork and handle bar. The frame of the bicycle inclines downwardly from the front wheel fork toward the rear wheel. An elongated seat is fitted over the downwardly inclining frame and extends backwards rising arcuately over the rear wheel. In this way the seat has a double function in that the arcuate bottom surface of the seat over the rear wheel serves as a fender as well as a seat. With this arrangement, when smaller children ride the bicycle, they sit on the portion of the seat directly over the peddle. In this position the rearwardly inclined front wheel fork and handle bar puts the handle bar in close proximity to the arms of the child. Larger persons sit on the arcuate portion of the seat over the rear wheel and they are either directly over or slightly in back of the axis of the rear wheel to permit the rider to cause the front wheel of the bicycle to rise up by merely shifting his weight to the rear as he rides the bicycle.

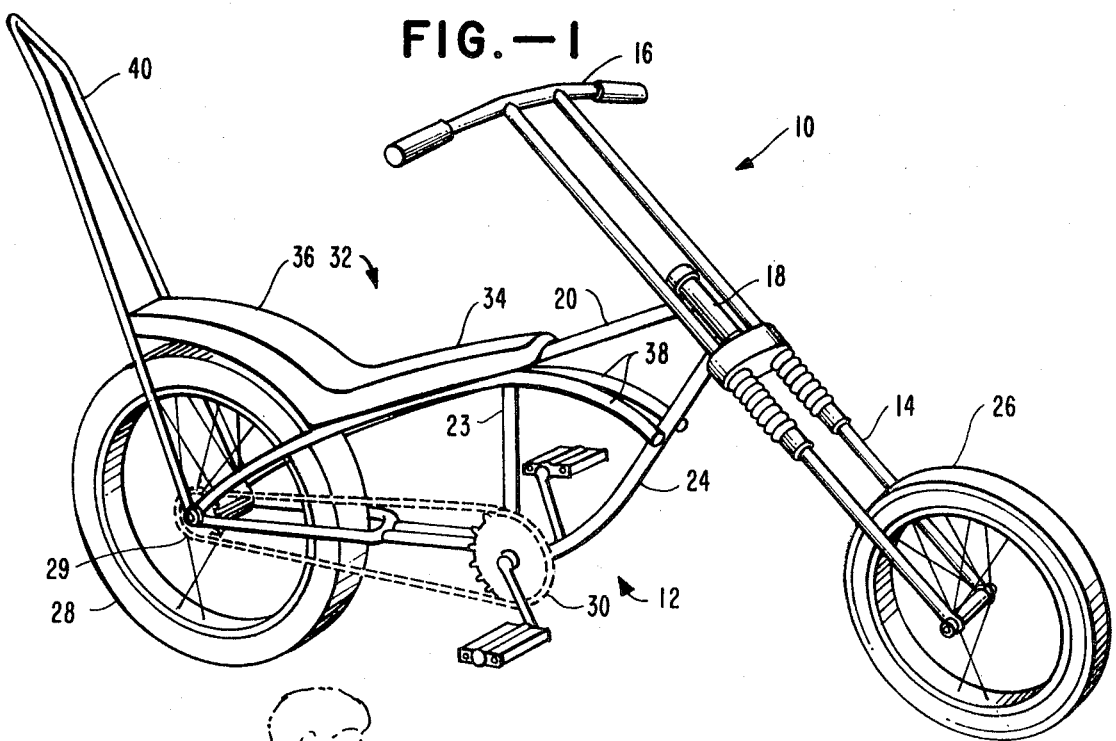
FIG.—1
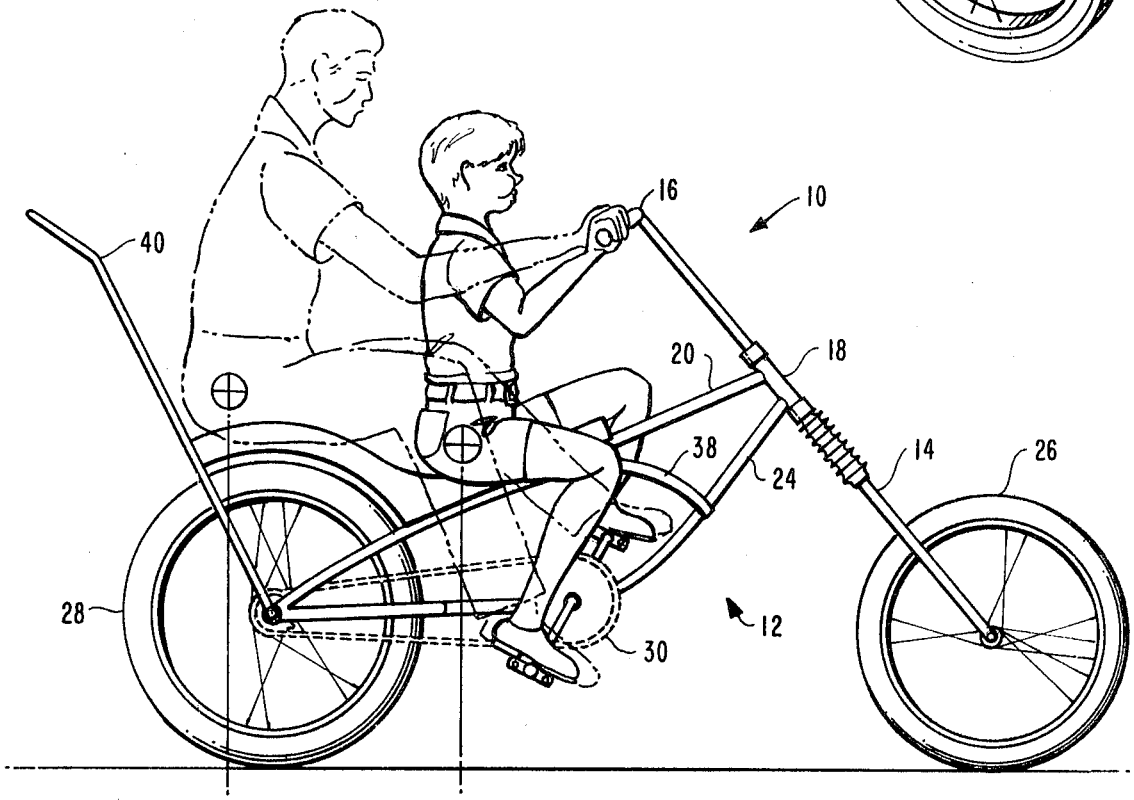
FIG.—2
INVENTOR
MICHAEL G. BLACK

PATENTED JUL 27 1971

INVENTOR
MICHAEL G. BLACK

BY Julius Louis Carlinstein

ATTORNEY

BICYCLE TO ACCOMODATE DIFFERENT SIZE RIDERS

BRIEF SUMMARY

Bicycles heretofore known were made in different sized to accommodate different size people. As a child grew, it was necessary, periodically, to buy him a larger bicycle. Although the vertical seat adjustment of conventional bicycles did provide limited compensation for the growing child, it was still necessary to provide the child with a bicycle corresponding to his size. In a family of several children it was necessary to have several bicycles of different sizes for the different children. This was expensive, and it would be desirable to provide a bicycle which can be comfortably used by children of almost any size.

What is needed therefore, and among other things comprises an important part of this invention, is to provide a bicycle which, without adjustment, can accommodate riders ranging in size from small children to adults.

A further object of this invention is to provide a bicycle wherein the seat is arranged so that the weight of the rider can be positioned over the axis of the rear wheel to permit the front wheel of the bicycle to rise in the air whenever the rider of the bicycle shifts his weight slightly to the rear.

These, and other objects of this invention, will become more apparent when read in the light of the accompanying specification and drawings, wherein:

FIG. 1 is a front perspective view of the bicycle.

FIG. 2 is a side elevational view of the bicycle showing in full lines the position of a small child riding the bicycle and in dotted lines the position of a substantially full-grown person riding the same bicycle.

Figure 3:
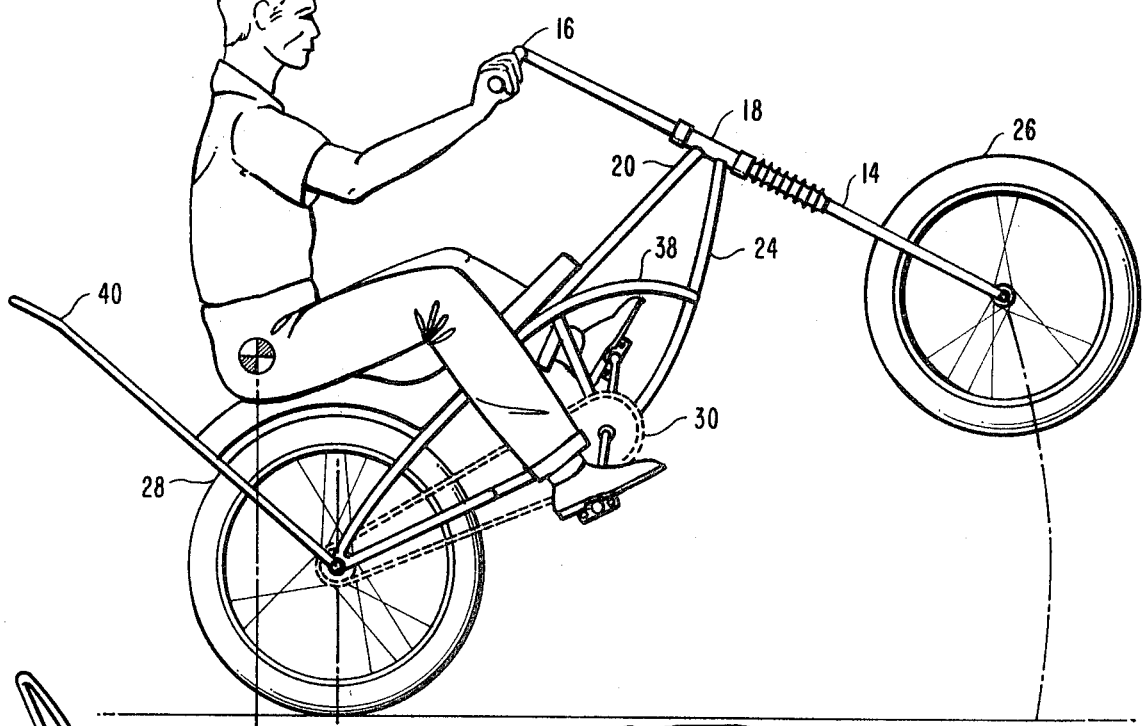

FIG. 3 discloses the position of a person riding the bicycle wherein the rider has caused the front wheel of the bicycle to rise off the ground.

Figure 4:
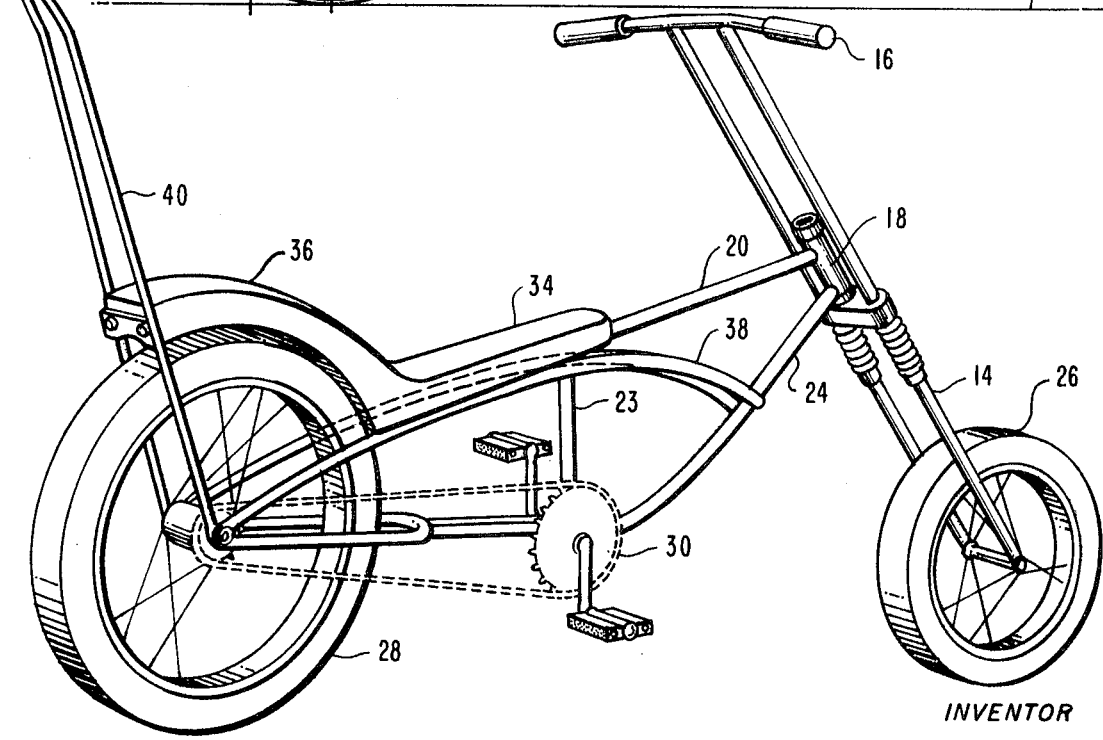

FIG. 4 discloses a rear perspective view of the bicycle.

Referring now to FIG. 1 of the drawing, the bicycle constructed according to the principles of this invention is indicated generally by the reference numeral 10. The bicycle includes a frame indicated generally by the reference numeral 12. The frame includes a rearwardly inclined front frame member 18. A rearwardly inclined split front wheel fork 14 is rotatably mounted on the front frame member 18. A handle 16 is secured to the top portion of the front wheel fork as shown. The front wheel fork rotates on the front frame member 18 to permit the front wheel 26 of the bicycle to turn.

A downwardly, rearwardly inclined top frame bar 20 is secured at its upper end to the front frame member 18 and at its opposite end to a generally vertical support bar 23. The lower end of the support bar 23 is secured to the bottom frame bar 24. The front sprocket and pedals 30 are also secured to the bottom frame bar in a manner well known in the art. The bicycle is also provided with a rear wheel 28 on which the rear sprocket 29 is mounted in a manner well known in the art. In addition, a double-arcuate seat support bar 38 is secured at one end to the front of the bottom frame bar 24 and at the opposite end to the axles of the rear wheel 28. An elongated seat 32 is mounted on and its front portion is supported by the downwardly inclined frame bar 20. The seat has a front, generally straight, portion 34 which lies over the arcuate frame member 38 and the rearwardly inclined bar 20. In addition, the seat includes an arcuate rear portion 36 which rises up over the rear wheel 28 and is supported by the rear seat support bar 40. In the particular embodiment shown, the bicycle is designed so the front wheel is smaller in diameter than the rear wheel both for style and for reasons to become apparent below.

As shown in the drawing, the forward portion of the seat 34 lies over the front sprocket and pedals 30 and is at a comparatively short distance from the pedals because of the downward inclination of the bar 20. Furthermore, the inclination of the front fork also puts the handle bars a short distance from the front portion 34 of the seat. In this way a small child can ride the bicycle because his feet can reach the pedals and his hands can reach the handle bars (see FIG. 2). A larger person would sit on the arcuate portion of the seat 36 over the rear axle (see FIG. 2). Since he would be a further distance from the front sprocket and pedals 30 he could ride the bicycle comfortably. In addition, since weight of a larger person is concentrated over the axle of the rear wheel or even slightly to the rear of the axle of the rear wheel, the weight carried by the front wheel is insignificant so that such a person riding the bicycle could, by moving or leaning back in his seat, cause the front wheels of the bicycle to rise in the air. In this situation the smaller diameter of the front wheel 26 would appear to magnify the use of the front wheel.

The undersurface of the arcuate portion of the seat 36 is treated with a water resistant material so that it serves as a rear fender for the bicycle. In this way the seat serves a dual function.

With this arrangement, described thus for it can be seen that the seat does not need to be adjusted as in conventional bicycles and the bicycle can accommodate persons of substantially different sizes. In addition, it is apparent that the seat is long enough so that the passengers can be carried in comfort.

Obviously many modifications and variations in the present invention are possible in the light of the above teachings. It is therefore to be understood that within the scope of the appended claims the invention can be practiced otherwise than as specifically described.

I claim:

1. A bicycle of the class described comprising a frame having a rearwardly inclined front frame member, a rearwardly inclined front wheel fork rotatably secured to the front frame member, the lower end of said fork connected to the axle of the front wheel of the bicycle, the upper end of said fork connected to the handle bar, a downwardly rearwardly inclined frame member secured at one end to said front frame member, said frame including a bottom frame bar, said bottom frame bar secured at one end to said front frame member, the opposite end of said bottom frame bar secured to the axle of the rear wheel of the bicycle, a sprocket and pedals mounted on the bottom frame bar beneath said rearwardly inclined frame member, and elongated seat, said seat having a front portion and a rear portion, said front portion mounted directly on and supported by the rearwardly inclined frame member over the sprocket and pedals and beneath the handle bar, said rear portion rising arcuately over the rear wheel of the bicycle, whereby small children can ride the bicycle by sitting on the front portion of the elongated seat and larger persons can ride the bicycle by sitting on the arcuate portion of the seat over the rear wheel of the bicycle.

2. The bicycle described in claim 1 wherein the arcuate portion of the elongated seat over the rear wheel has a lower surface treated with a water resistant material, said lower surface serving as the rear fender for the bicycle.

3. The bicycle described in claim 1 wherein the arcuate portion of the elongated seat extends rearwardly beyond the axle of the rear wheel whereby a person riding on the bicycle and sitting on the arcuate portion of the seat can, by moving rearwardly cause the front wheel of the bicycle to lift off the ground while the bicycle is moving.

4 The bicycle described in claim 1 wherein the front wheel of the bicycle has a substantially smaller diameter than the rear wheel of the bicycle.